(12) United States Patent
Li et al.

(10) Patent No.: US 9,424,418 B2
(45) Date of Patent: Aug. 23, 2016

(54) INFORMATION PROCESSING DEVICE AND METHOD FOR SWITCHING PASSWORD INPUT MODE

(71) Applicant: LENOVO (BEIJING) CO., LTD., Beijing (CN)

(72) Inventors: Fanzhi Li, Beijing (CN); Xuguo Liu, Beijing (CN)

(73) Assignees: LENOVO (BEIJING) CO., LTD., Haidian District, Beijing (CN); BEIJING LENOVO SOFTWARE LTD., Haidian District, Beijing (CN)

( * ) Notice: Subject to any disclaimer, the term of this patent is extended or adjusted under 35 U.S.C. 154(b) by 0 days.

(21) Appl. No.: 13/736,171

(22) Filed: Jan. 8, 2013

(65) Prior Publication Data

US 2013/0179965 A1 Jul. 11, 2013

(30) Foreign Application Priority Data

Jan. 9, 2012 (CN) .......................... 2012 1 0004355

(51) Int. Cl.
*G06F 17/30* (2006.01)
*G06F 21/45* (2013.01)
*G06F 21/32* (2013.01)

(52) U.S. Cl.
CPC ................ *G06F 21/45* (2013.01); *G06F 21/32* (2013.01); *G06F 2221/2105* (2013.01)

(58) Field of Classification Search
CPC ... G06F 21/32; H04L 63/0861; H04L 9/3231; H04L 63/083
See application file for complete search history.

(56) References Cited

U.S. PATENT DOCUMENTS

| 7,881,524 | B2 | 2/2011 | Matsugu et al. |
| 8,621,588 | B2 * | 12/2013 | Yoshida ........................... 726/7 |
| 2003/0154084 | A1 | 8/2003 | Li et al. |
| 2006/0228005 | A1 | 10/2006 | Matsugu et al. |
| 2009/0152343 | A1 * | 6/2009 | Carter et al. .................. 235/379 |
| 2012/0075062 | A1 * | 3/2012 | Osman et al. ................ 340/5.61 |

(Continued)

FOREIGN PATENT DOCUMENTS

| CA | 2439613 A1 * | 10/2010 |
| CN | 1633670 | 6/2005 |
| CN | 101360301 | 2/2009 |

(Continued)

OTHER PUBLICATIONS

First Examination Report dated Sep. 2, 2013 from corresponding Chinese application No. 2012100043559 (13 pages including English translation).

(Continued)

*Primary Examiner* — Mohammed Waliullah
(74) *Attorney, Agent, or Firm* — Brinks Gilson & Lione; G. Peter Nichols

(57) ABSTRACT

The present invention discloses an information processing device and the switching method for the password input mode thereof. The information processing device includes a usage scene monitoring unit configured to monitor the usage scene or the usage environment of the information processing device and a password input switching unit, configured to judge the usage scene or the usage environment of the information processing device 1 based on the output of the usage scene monitoring unit and to determine whether the password input mode should be switched based on the judgment result.

10 Claims, 1 Drawing Sheet

(56) References Cited

U.S. PATENT DOCUMENTS

2012/0212354 A1* 8/2012 Broga et al. .................. 341/22
2013/0159699 A1* 6/2013 Torkkel .......................... 713/155

FOREIGN PATENT DOCUMENTS

| | | |
|---|---|---|
| CN | 101727549 | 6/2010 |
| CN | 102052018 | 5/2011 |
| JP | 2006-293644 | 10/2006 |
| JP | 2009-251951 | 10/2009 |
| KR | 10-2011-0088959 | 8/2011 |
| KR | 10-2011-0116346 | 10/2011 |

OTHER PUBLICATIONS

Second Office Action dated May 9, 2014 from corresponding Chinese Application No. 201210004355.9 (15 pages including English translation).

Notice of Allowance dated Jul. 10, 2014 from corresponding Korean Application No. 10-2013-0001465 (3 page English translation).

Office Action dated Jan. 22, 2014 from corresponding Korean Application No. 10-2013-0001465 (6 pages including English translation).

* cited by examiner

INFORMATION PROCESSING DEVICE AND METHOD FOR SWITCHING PASSWORD INPUT MODE

This application claims priority to Chinese patent application CN201210004355.9 filed Jan. 9, 2012, the entire contents of which is incorporated herein by reference.

The present application relates to an information processing device and a method for switching the password input mode.

BACKGROUND

At present, notebook computers using touch screens or pad computers with keyboard docking stations and the like are becoming more and more popular. Typically, when a notebook computer with a touch screen rotates its touch screen by 180° or "back flips" its touch screen to the back of the notebook computer to make the notebook computer used as a pad computer, the keyboard of the notebook computer will usually be locked. In this case, the password can only be input through the virtual keyboard displayed on the touch screen (such as the power-on password or screen lock password). However, the user experience of the virtual keyboard is usually poor. Moreover, in the case that the notebook computer or pad computer determines whether the user can use the notebook computer or pad computer by using the face recognition technology, if the user is using the notebook computer or pad computer in a dark environment, it is difficult to obtain the user's face portrait and determine whether the user can use the notebook computer or pad computer through the face recognition technology.

SUMMARY

In order to solve the above technical problem in the prior art, according to one aspect of the present invention, an information processing device is provided, comprising: a usage scene monitoring unit, configured to monitor the usage scene or the usage environment of the information processing device; and a password input switching unit, configured to judge the usage scene or the usage environment of the information processing device based on the output of the usage scene monitoring unit and determine whether the password input mode should be switched based on the judgment result.

Further, according to one embodiment of the present invention, wherein, if the password input switching unit determines that the information processing device is in a first usage scene or usage environment, the password input switching unit will set the password input mode to the first password input mode. Further, if the password input switching unit determines that the information processing device is in a second usage scene or usage environment, the password input switching unit will set the password input mode to the second password input mode.

Further, according to one embodiment of the present invention, wherein, the first usage scene of the information processing device is a notebook usage scene of the information processing device, while the second usage scene of the information processing device is a pad usage scene of the information processing device; in the first password input mode, the password is acquired by pressing the keyboard or clicking the mouse; and in the second password input mode, the password is acquired by the user's touch track on the touch screen.

Further, according to one embodiment of the present invention, wherein the usage scene monitoring unit is an ambient light sensing unit, and is configured to monitor the ambient light intensity around the information processing device; the first usage environment is an environment where the ambient light intensity around the information processing device is higher than a preset threshold value, whereas the second usage environment is an environment where the ambient light intensity around the information processing device is lower than the preset threshold value.

According to one embodiment of the present invention, the information processing device further comprises: a face recognition unit, configured to recognize the user's face image taken by the information processing device, in order to enable/disable the user to use the information processing device; and a voice recognition unit, configured to recognize the user's voice recorded by the information processing device, in order to enable/disable the user to use the information processing device, wherein in the first password input mode, the user is enabled/disabled to use the information processing device based on the user's face recognition; and in the second password input mode, the user is enabled/disabled to use the information processing device based on the user's voice recognition.

Further, according to another aspect of the present invention, a method for switching password input modes of the information processing device is provided, the method comprising: monitoring the usage scene or usage environment of the information processing device; judging the usage scene or usage environment of the information processing device based on the monitoring results; and determining whether to switch the password input mode based on the judging result.

Further, according to one embodiment of the present invention, wherein if it is determined that the information processing device is in the first usage scene, then the password input mode is set to the first password input mode; if it is determined that the information processing device is in the second usage scene, the password input mode is set to the second password input mode.

Further, according to one embodiment of the present invention, wherein the first usage scene is the notebook usage scene of the information processing device; the second usage scene is the pad usage scene of the information processing device; in the first password input mode, the password is acquired by pressing the keyboard or clicking the mouse; and in the second password input mode, the password is acquired by the user's touch track on the touch screen.

Further, according to one embodiment of the present invention, wherein the monitoring the usage scene or usage environment of the information processing device further comprises: monitoring the ambient light intensity around the information processing device, wherein, the first usage environment is an environment where the ambient light intensity around the information processing device is higher than a preset threshold value, whereas the second usage environment is an environment where the ambient light intensity around the information processing device is lower than the preset threshold value.

Further, according to one embodiment of the present invention, wherein in the first password input mode, the user is enabled/disabled to use the information processing device based on the user's face reorganization; and in the second password input mode, the user is enabled/disabled to use the information processing device based on the user's voice recognition.

With the above configuration, the password input mode can be flexibly switched according to different usage scenes/environments of the information processing device. Thus, the password can be input in the way that is the most convenient for the user in different usage scenes/environments of the information processing device.

DETAILED DESCRIPTION

Figure 1:
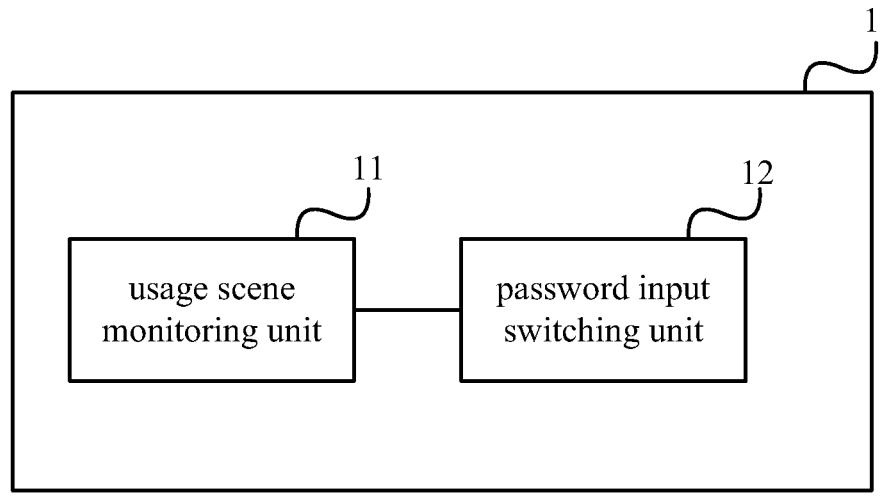
FIG. 1 a schematic block diagram illustrating the structure of the information processing device according to an embodiment of the present invention.

Each embodiment of the present invention will be described with reference to the accompanying drawings. It should be noted that, in the drawings, the same reference will be given to the parts having substantially the same or similar structure and function and the repeated descriptions thereof will be omitted.

The information processing device according to an embodiment of the present invention will be described with reference to FIG. 1. The information processing device herein according to an embodiment of the present invention may include a notebook computer having a pad mode or a pad computer and the like.

As shown in FIG. 1, the information processing device 1 according to an embodiment of the present invention may comprise a usage scene monitoring unit 11 and a password input switching unit 12

Herein, the usage scene monitoring unit 1 monitors the usage scene or the usage environment of the information processing device 1, while the password input switching unit 12 can judge the usage scene or the usage environment of the information processing device 1 based on the output of the usage scene monitoring unit, and determines whether the password input mode should be switched based on the judgment result.

For example, if the password input switching unit 12 determines that the information processing device 1 is in a first usage scene or usage environment, the password input switching unit 12 will set the password input mode to the first password input mode. Further, if the password input switching unit 12 determines that the information processing device is in a second usage scene or usage environment, the password input switching unit 12 will set the password input mode to the second password input mode.

The structure and operation of the information processing device will now be described according to different embodiments.

For example, according to one embodiment of the present invention, the usage scene monitoring unit 11 can be implemented by any of the processor, microprocessor or DSP. Additionally, the password input switching unit 12 can also be implemented by any of the processor, microprocessor or DSP. In this case, under the control of the preset software, the processor of the information processing device can implement the functions of the usage scene monitoring unit 11 and the password input switching unit 12.

Herein, according to the present embodiment, the first usage scene of the information processing device 1 can be a notebook usage scene of the information processing device 1, while the second usage scene of the information processing device can be a pad usage scene of the information processing device 1. For example, in the case that the information processing device 1 is a notebook computer with the pad computer function, the first usage scene can be an ordinary usage scene (notebook configuration) of the information processing device 1, and the second usage scene can be a pad usage scene wherein the touch screen (not shown) of the information processing device 1 is rotated by 180° to the keyboard (not shown) of the information processing device 1 or "back flipped" to the back of the information processing device 1. Additionally, in the case that the information processing device 1 is a pad computer with a keyboard docking station, the first usage scene can be a scene where the information processing device 1 is connected to the keyboard docking station, while the second usage scene can be a scene where the information processing device 1 is separate from the keyboard docking station.

Herein, the usage scene monitoring unit 11 can monitor the usage scene of the information processing device 1 by monitoring, for example, whether the keyboard of the information processing device 1 is available. For example, in the pad usage scene of the notebook with a pad function (the second usage scene), the keyboard function of the notebook is disabled, then the usage scene monitoring unit 11 can determine the usage scene of the information processing device 1 by monitoring the signal disabling the keyboard function. Further, when the information processing device 1, such as a pad computer or the like, is separate from the keyboard docking station, a disconnecting signal indicating disconnection to the keyboard docking station can be used as a signal for determining the usage scene of the information processing device 1.

The usage scene monitoring unit 11 determines the usage scene of the information processing device 1 based on the above-described signals, and transmits the monitoring results to the password input switching unit 12. In this case, the password input switching unit 12 determines whether to switch the password input mode based on the output (monitoring result) of the usage scene monitoring unit 11. For example, when the password input switching unit 12 judges that the information processing device 1 is in the first usage scene, the password input switching unit 12 sets the password input mode to a first password input mode, whereas when the password input switching unit 12 judges that the information processing device 1 is in the second usage scene, the password input switching unit 12 sets password input mode is to the second password input mode. Here, if the password input switching unit 12 sets the password input mode to the first password input mode, in the first password input mode the password is acquired by pressing the keyboard or clicking the mouse. In addition, if the password input switching unit 12 sets the password input mode to the second password input mode, in the second password input mode the password is acquired by the user's touch track on the touch screen. For example, a predetermined image can be stored previously in the information processing device 1 as a password, and the user's touch track on the touch screen is compared with the predetermined image as so to allow or disallow the user to use the information processing device 1.

In this case, in the notebook usage scene (the first usage scene) of the information processing device 1, the password can be input by using the keyboard or the mouse, whereas in the pad usage scene (the second usage scene) of the information processing device 1, the password can be input by the user's touch track on the touch screen. Thus in different usage scenes, the information processing device 1 can provide the user with a flexible and convenient password input mode, thereby improving the user's usage experience.

In addition, according to another embodiment of the present invention, the usage scene monitoring unit 11 can be an ambient light sensing unit, and is used to monitor the ambient light intensity around the information processing device 1. Herein, the usage scene monitoring unit 11 can be implemented by any light or brightness sensor. Additionally, the password input switching unit 12 can be any of the processor, microprocessor or DSP.

According to the present embodiment, the first usage environment can be an environment where the ambient light intensity around the information processing device 1 is higher than a preset threshold value, whereas the second usage environment can be an environment where the ambient light intensity around the information processing device 1 is lower than (or equal to) the preset threshold value. Here, the preset threshold value can be stored in the information processing device 1, and can be set to an experience value. In addition, it can be set in the operating system (e.g., android) or a dedicated application by the user based on his/her preference.

In the present embodiment, the information processing device 1 shown in FIG. 1 can also further comprises a face recognition unit (not shown) and a voice recognition unit (not shown). Here, the face recognition unit can be implemented by the processor, the camera, and the face recognition application or function of the information processing device 1, and is used to recognize the user's face image taken by the information processing device 1, in order to enable/disable the user to use the information processing device 1. In addition, the voice recognition unit can be implemented by the processor, the voice acquisition apparatus (e.g., microphone) and the voice recognition application of the information processing device 1, and is used to recognize the user's voice recorded by the information processing device 1, in order to enable/disable the user to use the information processing device 1.

In this case, the usage scene monitoring unit 11 can continuously or periodically monitor the ambient light around the information processing device 1 to monitor the use environment of the information processing device 1, and transmits the monitoring results to the password input switching unit 12. In this case, the password input switching unit 12 judges whether to switch the password input mode based on the output (monitoring result) of the usage scene monitoring unit 11. For example, when the password input switching unit 12 judges that the information processing device 1 is in the first usage scene (the brightness of the ambient light is higher than the preset threshold), the password input switching unit 12 sets the password input mode to the first password input mode, whereas when the password input switching unit 12 judges that the information processing device 1 is in the second usage scene (the brightness of the ambient light is below or equal to the preset threshold value), the password input switching unit 12 set the password input mode to the second password input mode. Here, if the password input switching unit 12 set the password input mode to the first password input mode, then in the first password input mode, the user is enabled/disabled to use the information processing device 1 based on the user's face recognition. Specifically, the face recognition unit of the information processing device 1 firstly acquires the user's face image, and the acquired face recognition image as a password to be compared with the user's face image stored beforehand in the information processing device 1 so as to enable/disable the user to use the information processing device based on the comparison result. In addition, if the password input switching unit 12 sets the password input mode to the second password input mode, then in the second password input mode, the user is enabled/disabled to use the information processing device 1 based on the user's voice recognition. Specifically, the voice recognition unit of the information processing device 1 firstly acquires the user's voice, and the acquired user's voice as a password input is compared with the user's voice stored beforehand in the information processing device 1 (e.g., to match the voice frequencies or feature values of the two), so as to enable/disable the user to use the information processing device based on the comparison result.

In this case, in the case that the ambient light around the information processing device 1 is relatively strong (the first usage environment), the password can be input by the way of the face recognition (the first password input mode), whereas in the case that the ambient light around the information processing device 1 is relatively weak (the second usage environment), the password can be input by the way of the user's voice (the second password input mode). Thus, in different usage scenes, the information processing device 1 can provide the user a flexible and convenient password input mode, thereby improving the user's usage experience.

Each embodiment of the present invention is described above, but the present invention is not limited thereto. For example, in the case that the first usage scene is the notebook usage scene of the information processing device 1 and the second usage scene is the pad usage scene of the information processing device 1, the first password input mode can be the mode in which the password is input through the keyboard or the mouse, whereas the second password input mode can be the mode in which the password input through voice. In addition, in the case that the first usage environment is a high brightness environment and the second usage environment is a low brightness environment, the first password input mode can be the mode in which the password is input through the user's face image, whereas the second password input mode can be the mode in which the password is input through the user's sliding track on the touch screen. In addition, as long as it can meet the needs of switching the password input modes between different scenes/environments and the switched password input mode is convenient for the user, other password input modes can also be used.

With the above configuration, the password input mode can be flexibly switched according to different usage scenes/environments of the information processing device 1. Thus, the password can be input in the way that is the most convenient for the user in different usage scenes/environments of the information processing device 1.

Figure 2:
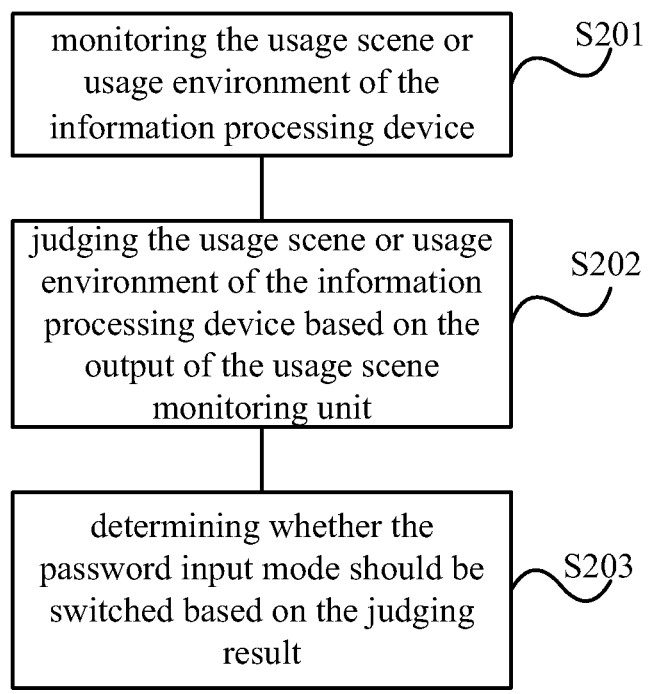
FIG. 2 a flow chart illustrating the method for switching the password input mode according to an embodiment of the present invention.

With reference to FIG. 2, the switching method for the password input mode according to an embodiment of the present invention will be described below. FIG. 2 is a flow chart illustrating the switching method of password input modes according to an embodiment of the present invention. Password input mode switching method shown in FIG. 2 can be applied to the information processing device 1 shown in FIG. 1.

As shown in FIG. 2, in step S201, the usage scene or usage environment of the information processing device is monitored.

Specifically, according to one embodiment of the present invention, a first usage scene of the information processing device 1 can be a notebook usage scene of the information processing device 1, whereas a second usage scene can be a pad usage scene of the information processing device 1. Additionally, in the case that the information processing device 1 is a pad computer having a keyboard docking station, the first usage scene can be a scene where the information processing device 1 is connected to the keyboard docking station, while the second usage scene can be a scene where the information processing device 1 is separate from the keyboard docking station. In this case, the usage scene monitoring unit 11 can monitor the usage scene of the information processing device 1 by monitoring whether the keyboard of the information processing device 1 is available.

In addition, according to another embodiment of the present invention, the first usage environment can be an environment where the ambient light intensity around the information processing device 1 is higher than the preset threshold value, whereas the second usage environment can be an environment where the ambient light intensity around the information processing device 1 is lower than (or equal to) the preset threshold value. Here, the preset threshold value can be stored in the information processing device 1, and can be set to an experience value. In addition, it can be set in the operating system (e.g., android) or a dedicated application by the user based on his/her preference. In this case, the usage scene monitoring unit 11 can be an ambient light sensing unit, and is used to monitor the ambient light intensity around the information processing device 1. Then the usage scene monitoring unit 11 can continuously or periodically monitor the ambient light around the information processing device 1 to monitor the usage environment of the information processing device 1.

Then, in step S202, the usage scene or usage environment of the information processing device is judged based on the output of the usage scene monitoring unit.

Specifically, according to one embodiment of the present invention, the password input switching unit 12 judges the usage scene of the information processing device 11 based on the output of the usage scene monitoring unit 11. For example, if the password input switching unit 12 judges that the keyboard of the information processing device 1 is available based on the output of the usage scene monitoring unit 11, the password input switching unit 12 will judge that the information processing device 1 is in the first usage scene, whereas if the password input switching unit 12 judges that the keyboard of the information processing device 1 is not available based on the output of the usage scene monitoring unit 11, the password input switching unit 12 will judge that the information processing device 1 is in the second usage scene.

Additionally, according to another embodiment of the present invention, the password input switching unit 12 judges the usage scene of the information processing device 1 based on the output of the usage scene monitoring unit 11. For example, if the password input switching unit 12 judges that the ambient light around the information processing device 1 is relatively strong based on the output of the usage scene monitoring unit 11, the password input switching unit 12 will judge that the information processing device 1 is in the first usage scene, whereas if the password input switching unit 12 judges that the ambient light around the information processing device 1 is relatively weak based on the output of the usage scene monitoring unit 11, the password input switching unit 12 will judge that the information processing device 1 is in the second usage scene.

Then, in step S203, whether to switch the password input mode is determined based on the judging result.

Specifically, according to one embodiment of the present invention, if the password input switching unit 12 judges the information processing device 1 is in the first usage scene, then the password input switching unit 12 sets the password input mode to the first password input mode. Here, in the first password input mode, the password is acquired by pressing the keyboard or clicking the mouse. In addition, if the password input switching unit 12 judges that the information processing device 1 is in the second usage scene, the password input switching unit 12 sets the password input mode to the second password input mode. Here, in the second password input mode, the password is acquired by the user's touch track on the touch screen.

Further, according to another embodiment of the present invention, if the password input switching unit 12 judges that the information processing device 1 is in the first usage scene, the password input switching unit 12 sets the password input mode to the first password input mode. Here, in the first password input mode, the user is enabled/disabled to use the information processing device 1 based on the user's face recognition. Specifically, the face recognition unit of the information processing device 1 firstly acquires the user's face image, and the acquired face recognition image as a password input is compared with the user's face image stored beforehand in the information processing device 1 so as to enable/disable the user to use the information processing device based on the comparison result. In addition, if the password input switching unit 12 judges that the information processing device 1 is in the second usage scene, the password input switching unit 12 sets the password input mode to the second password input mode. Here, in the second password input mode, the user is enabled/disabled to use the information processing device 1 based on the user's voice recognition. Specifically, the voice recognition unit of the information processing device 1 firstly acquires the user's voice, and the acquired user's voice as a password input is compared with the user's voice stored beforehand in the information processing device 1 (e.g., to match the voice frequencies or feature values of the two), so as to enable/disable the user to use the information processing device based on the comparison result.

Additionally, the present invention is not limited to the case shown in FIG. 2. For example, in the case that the first usage scene is the notebook usage scene of the information processing device 1 and the second usage scene is the pad usage scene of the information processing device 1, the first password input mode can be the mode in which the password is input through the keyboard or the mouse, whereas the second password input mode can be the mode in which the password input through voice. In addition, in the case that the first usage environment is a high brightness environment and the second usage environment is a low brightness environment, the first password input mode can be the mode in which the password is input through the user's face image, whereas the second password input mode can be the mode in which the password is input through the user's sliding track on the touch screen. In addition, as long as it can meet the needs of switching the password input modes between different scenes/environments and the password input mode switched to be convenient for the user; other password input modes can also be used.

As described above, various embodiments of the present invention have been specifically described above, but the present invention is not limited thereto. It should be understood by those skilled in the art that various modifications, combinations, sub-combinations, or replacements can be carried out according to the designing requirements or other factors, which, however, fall within the scope of the appended claims and their equivalents.

What is claimed is:

1. An information processing device, comprising:
   a usage scene sensor, configured to monitor a usage scene or a usage environment of the information processing device; and
   a processor, configured to judge the usage scene or the usage environment of the information processing device based on an output of the usage scene sensor before receiving inputs for authentication and to determine whether a password input mode should be switched based on the judgment result in order to provide the password input mode that is convenient for a user to input in the judged usage scene or the usage environment of the information processing device, wherein, different password input modes require different types of inputs for authentication and whether the password input mode should be switched is determined before inputs for authentication are received from the user.

2. The information processing device according to claim 1, wherein:
if the processor determines that the information processing device is in a first usage scene or use environment, the processor sets the password input mode to a first password input mode; and
if the password input switching unit determines that the information processing device is in a second usage scene or usage environment, the password input switching unit sets the password input mode to a second password input mode.

3. The information processing device according to claim 2, wherein:
the first usage scene of the information processing device is a notebook usage scene of the information processing device;
the second usage scene of the information processing device is a pad usage scene of the information processing device;
in the first password input mode, a password is acquired by pressing a keyboard or clicking a mouse; and
in the second password input mode, the password is acquired by a user's touch track on a touch screen.

4. The information processing device according to claim 2, wherein
the usage scene sensor is an ambient light sensing unit, configured to monitor ambient light intensity around the information processing device;
a first usage environment is an environment where the ambient light intensity around the information processing device is higher than a preset threshold value: and
a second usage environment is an environment where the ambient light intensity around the information processing device is lower than the preset threshold value.

5. The information processing device according to claim 4, further comprising:
a face recognition unit, configured to recognize the user's face image taken by the information processing device, in order to enable/disable the user to use the information processing device; and
a voice recognition unit, configured to recognize the user's voice recorded by the information processing device, in order to enable/disable the user to use the information processing device,
wherein in the first password input mode, the user is enabled/disabled to use the information processing device based on the user's face recognition; and
in the second password input mode, the user is enabled/disabled to use the information processing device based on the user's voice recognition.

6. A switching method for password input modes of the information processing device, comprising:
monitoring usage scene or usage environment of an information processing device;
judging the usage scene or usage environment of the information processing device based on the monitoring result before receiving inputs for authentication; and
determining whether the password input mode should be switched based on the judging result in order to provide the password input mode that is convenient for a user to input in the judged usage scene or the usage environment of the information processing device, wherein, different password input modes require different types of inputs for authentication and whether the password input mode should be switched is determined before inputs for authentication are received from the user.

7. The switching method according to claim 6, wherein:
if it is determined that the information processing device is in a first usage scene or use environment, the password input mode is set to a first password input mode; and
if it is determined that the information processing device is in a second usage scene or usage environment, the password input mode is set to a second password input mode.

8. The switching method according to claim 7, wherein:
the first usage scene is a notebook usage scene of the information processing device;
the second usage scene is a pad usage scene of the information processing device;
in the first password input mode, the password is acquired by pressing a keyboard or clicking a mouse; and
in the second password input mode, the password is acquired by a user's touch track on a touch screen.

9. The switching method according to claim 7, wherein the monitoring the usage scene or usage environment of the information processing device further comprises:
monitoring ambient light intensity around the information processing device,
wherein, a first usage environment is an environment where the ambient light intensity around the information processing device is higher than a preset threshold value; and
a second usage environment is an environment where the ambient light intensity around the information processing device is lower than the preset threshold value.

10. The switching method according to claim 9, wherein
in the first password input mode, the user is enabled/disabled to use the information processing device based on the user's face recognition; and
in the second password input mode, the user is enabled/disabled to use the information processing device based on the user's voice recognition.

* * * * *